US005970025A

United States Patent [19]
Cole et al.

[11] Patent Number: 5,970,025
[45] Date of Patent: Oct. 19, 1999

[54] ULTRASOUND BEAMFORMATION INTEGRATED CIRCUIT AND METHOD

[75] Inventors: Christopher R. Cole, Redwood City; C. Geoffrey E. Fernald, Belmont, both of Calif.

[73] Assignee: Acuson Corporation, Mountain View, Calif.

[21] Appl. No.: 09/095,324

[22] Filed: Jun. 10, 1998

[51] Int. Cl.[6] .................................................. G03B 42/06
[52] U.S. Cl. ............................................. 367/138; 367/11
[58] Field of Search ................................ 367/7, 11, 138; 600/447

[56] References Cited

U.S. PATENT DOCUMENTS

| | | |
|---|---|---|
| 5,203,335 | 4/1993 | Noujaim et al. . |
| 5,675,554 | 10/1997 | Cole et al. . |
| 5,685,308 | 11/1997 | Wright et al. . |
| 5,722,412 | 3/1998 | Pflugrath et al. . |
| 5,744,898 | 4/1998 | Smith et al. . |
| 5,782,769 | 7/1998 | Hwang et al. ........................ 600/454 |
| 5,817,024 | 10/1998 | Olge et al. ........................... 600/447 |

OTHER PUBLICATIONS

S.R. Freeman, et al.; An Ultrasound Beamformer Using Oversampling; 1997 IEEE Ultrasonics Symposium; pp. 1687–1690.

Christoph Kuratli, et al. A Fully Integrated Self–Calibrating Transmitter/Receiver IC For An Ultrasound Presence Detector Microsystem; IEEE Journal Of Solid–State Circuits, vol. 33, No. 6, Jun. 1998, pp. 832–841.

William C. Black, Jr., et al. CMOS Chip For Invasive Ultrasound Imaging; IEEE Journal Of Solid–State Circuits, vol. 29, No. 11, Nov. 1994.

*Primary Examiner*—Daniel T. Pihulic
*Attorney, Agent, or Firm*—Craig A. Summerfield, Esq.; Brinks Hofer Gilson & Lione

[57] ABSTRACT

A method and system for an ultrasound beamformer with an integrated circuit is provided. Both digital transmit and digital receive beam formation are processed on a single integrated circuit receiver is provided. The transmit beamformer includes transmit logic and a digital to analog converter. The receive beamformer includes receive logic and an analog to digital converter. In one preferred embodiment, the integrated circuit includes a generic gate array with a designed logic metal layer for implementing the transmit and receive logic. The converters allow analog inputs and outputs, reducing the pin count. Reduction in pin count may permit cost reductions as process geometries become smaller. By placing both logic functions on one IC, fewer ICs are required in each system and the volume for that particular IC may increase, reducing the cost.

11 Claims, 4 Drawing Sheets

ULTRASOUND BEAMFORMATION INTEGRATED CIRCUIT AND METHOD

BACKGROUND OF THE INVENTION

This invention relates to an integrated circuit in an ultrasound system and, in particular, for transmit and receive beamforming.

Ultrasound systems are coherent imaging systems. To generate information for imaging, ultrasound systems include transmit and receive beamformers. For example, U.S. Pat. No. 5,675,554 describes a transmit beamformer, and U.S. Pat. No. 5,685,308 describes a receive beamformer.

Transmit beamformers include circuits for generating a transmit waveform. If the transmit waveform is digital, the transmit waveform is converted to an analog transducer excitation waveform. The analog waveform is amplified, and multiplexed to a transducer.

For the transmit beamformer of U.S. Pat. No. 5,675,554, the transmit beamformer circuits of FIG. 4 and digital to analog converter (DAC) switches are provided on one integrated circuit (IC) for each channel or each pair of channels. See column 29, lines 2–7. The resistors and other active circuits of the DAC are located separately from the IC. In this system, the DAC, transmit amplifier, and IC components are located on a transmit circuit board, and the multiplexer components are located on a multiplexer circuit board.

Receive beamformers typically include circuits for coherently summing echo signals from multiple transducer elements. The echo signals are multiplexed from the transducer to amplifiers. If the receive beamformer comprises digital processing circuits, the echo signals are converted from analog signals to digital signals. The digital echo signals are coherently summed. The summed signals are provided for further processing and scan conversion to generate an image. For the receive beamformer of U.S. Pat. No. 5,685,308, the receive beamformer circuits and the analog to digital converter (ADC) circuits comprise different devices. Furthermore, the receive beamformer and the ADC circuits are located on a beamformer board. The receive amplifiers are located on a receive board.

In "An Ultrasound Beamformer Using Oversampling," 1997 IEEE ULTRASONICS SYMPOSIUM, pages 1687–690, S. R. Freeman et al. disclose integrating onto one chip all array processing elements for receive and transmit processing. Furthermore, integration of A/Ds onto a chip with the digital processing elements forming beams is disclosed. In particular, circuitry for signal processing echo signals and a modulator portion of a Sigma Delta ADC are integrated on a common IC. On page 1690, S. R. Freeman et al. disclose storing a transmit pulse in an on-chip memory and buffering to various digital delay structures. The samples are clocked through the system just as done for receive, but in the end they are converted to high voltage drive signals that synthesize a fixed focus transmit beam.

Transceivers for transmission and reception processing are used in various communications and computer devices. These transceivers may comprise one IC. ADC, DAC and digital signal processing (DSP) functions may be integrated onto the communication or computer transceiver IC. Typically, the IC is a Complementary Metal Oxide Semiconductor (CMOS).

SUMMARY

The present invention is defined by the following claims, and nothing in this section should be taken as a limitation on those claims. By way of introduction, the preferred embodiment described below includes a method and system for ultrasound beamformation with an integrated circuit. Both digital transmit and digital receive beam processing is performed on a single integrated circuit. The transmit beam formation includes transmit logic and a digital to analog converter. The receive beam formation includes receive logic and an analog to digital converter. In one preferred embodiment, the integrated circuit includes a generic gate array with a designed logic metal layer for implementing the transmit and receive logic. The converters allow analog inputs and outputs, reducing the pin count. Reduction in pin count may permit cost reductions as transistor process geometries become smaller. By placing both logic functions on one IC, fewer ICs are required in each system and the volume for that particular IC may increase, reducing the cost.

In one aspect of the illustrated embodiment, an ultrasound system comprising a transmit beamformer and a receive beamformer is provided. An improvement to that system includes an integrated transceiver. The integrated transceiver comprises receive and transmit channels. The transmit channel comprises at least a portion of a digital to analog converter and transmit beamformer logic, and the receive channel comprises at least a portion of an analog to digital converter and receive beamformer logic.

In a second aspect of the illustrated embodiment, an integrated transceiver is provided in an ultrasound system. The integrated transceiver includes a control signal input, an ultrasound transmit waveform output, and transmit beamformer logic operatively connected to the control signal input. A digital to analog converter operably connects the transmit beamformer logic to the ultrasound transmit waveform output. The integrated transceiver also includes an ultrasound echo signal input and a receive signal output. An analog to digital converter operably connects to the ultrasound echo signal input, and receive beamformer logic operatively connects to the analog to digital converter and the receive signal output.

Further aspects and advantages of the invention are discussed below in conjunction with the preferred embodiments.

DETAILED DESCRIPTION OF PREFERRED EMBODIMENTS

Ultrasound systems include transducer elements and transmit and receive beamformers. The transmit beamformers generate excitation signals for a plurality of channels operatively connected to a plurality of the transducer elements. In response the excitation waveforms, the transducer elements generate and acoustic ultrasound waveforms focused along one or more beams. Reflections of the acoustic waveforms are converted into electrical signals by the transducer elements. These electrical signals are processed by the receive beamformer to generate data for ultrasound image processing.

In preferred embodiments discussed below, the transmit and receive beam formation processes of at least one channel are combined onto one IC. The combined transmit and receive processing comprises a transceiver. Either or both of the transmit and receive processing is associated with analog circuitry, digital circuitry or combinations thereof. Preferably, the transceiver transmits analog excitation waveforms and receives analog echo signals. For transmit waveforms, the waveform is preferably generated using digital processing and converted to an analog excitation waveform. For receive beamformer processing, the analog waveform is preferably converted to a digital waveform and processed digitally.

Figure 1:
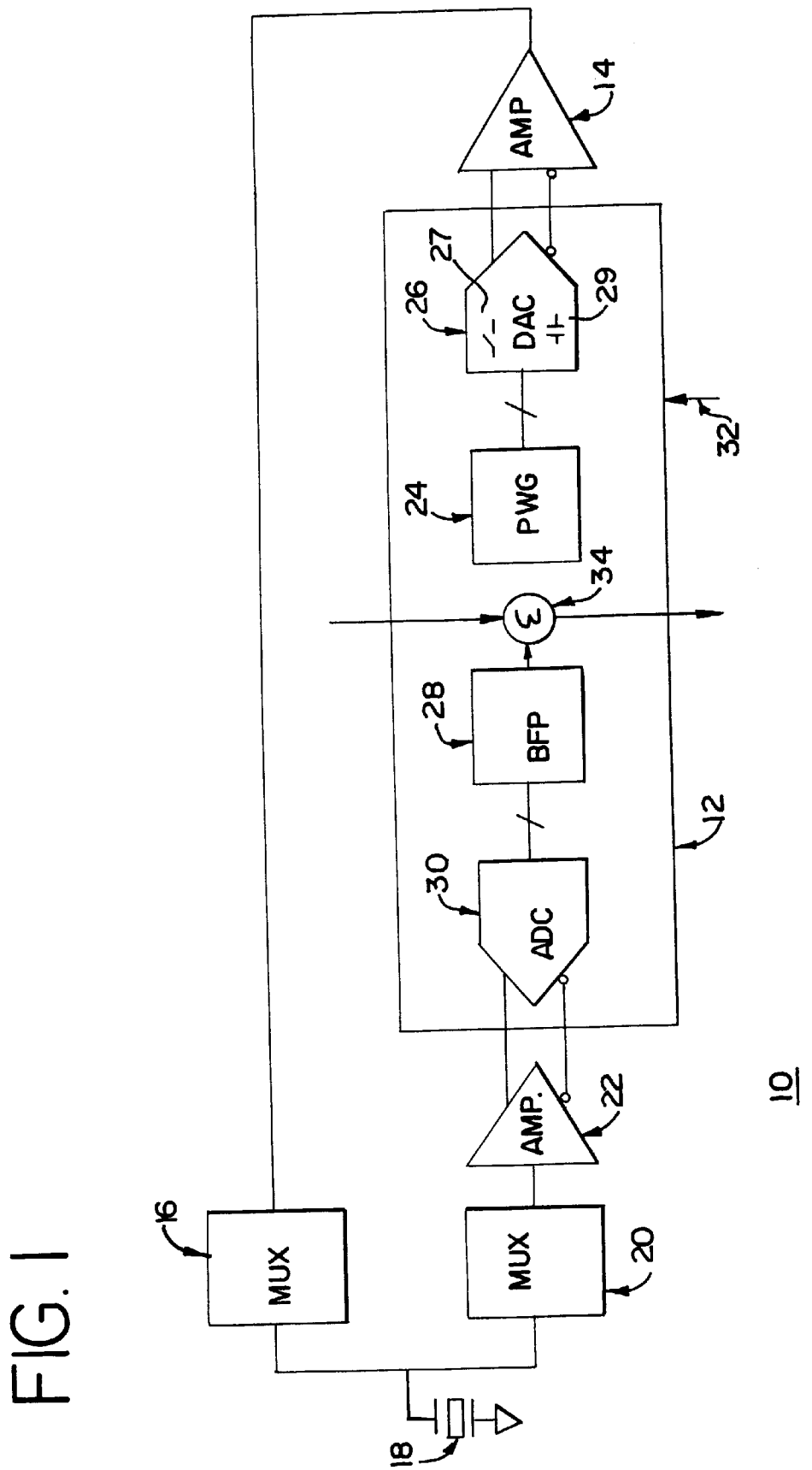
FIG. 1 is a block diagram of one embodiment of a portion of an ultrasound system including transmit and receive ultrasound beamformer channels.

Referring to FIG. 1, one embodiment of a transceiver channel and associated connections to a transducer element is shown generally at 10. The channel and connections 10 include a transceiver 12, a transmit amplifier 14, a transmit multiplexer 16, a transducer element 18, a receive multiplexer 20, and a receive amplifier 22.

The transmit amplifier 14 comprises a current and voltage amplifier with a programmable, variable or constant power supply. Other transmit amplifiers may be used. The transmit amplifier 14 amplifies excitation waveforms output by the transceiver 12. The amplified excitation waveforms are provided to the multiplexer 16.

The transmit and receive multiplexers 16 and 20 connect to the transducer element 18. Based on control signals, the transmit and receive multiplexers 16 and 20 switch between providing transmit and receive waveforms to or from, respectively, the transducer. Therefore, transmit and receive processing are provided at different times. In alternative embodiments, the transmit and receive channels are operatively connected to different transducer elements without any multiplexers. The transmit multiplexer 16 switches the amplified excitation waveform to the transducer 18. In response, the transducer element 18 generates an acoustic waveform.

The transducer element 18 generates electrical signals in response to acoustic reflections. The receive multiplexer 20 routes the electrical signals to the receive amplifier 22. The receive amplifier 22 comprises a current and voltage amplifier with a variable or constant power supply. Other amplifiers may be used. The receiver amplifier 22 amplifies the electrical signal. The amplified electrical signal is provided to the transceiver 12.

The transceiver 12 comprises an Application Specific Integrated Circuit (ASIC). Preferably, the transceiver comprises a CMOS IC. In alternative embodiments, other semiconductor structures may be used, such as bipolar semiconductors. In one embodiment, all layers, such as the transistors and connecting logic metal layers, are designed to implement the various functions described below.

The transceiver 12 includes a transmit channel and a receive channel on a single IC substrate. The transmit channel comprises a pulse wave generator 24 and a DAC 26. The receive channel includes an ADC 30, a beamformer processor 28 and a summer 34. The transceiver 12 also includes a control input 32 for controlling the pulse wave generator 24 and the beamformer processor 28.

Figure 2:
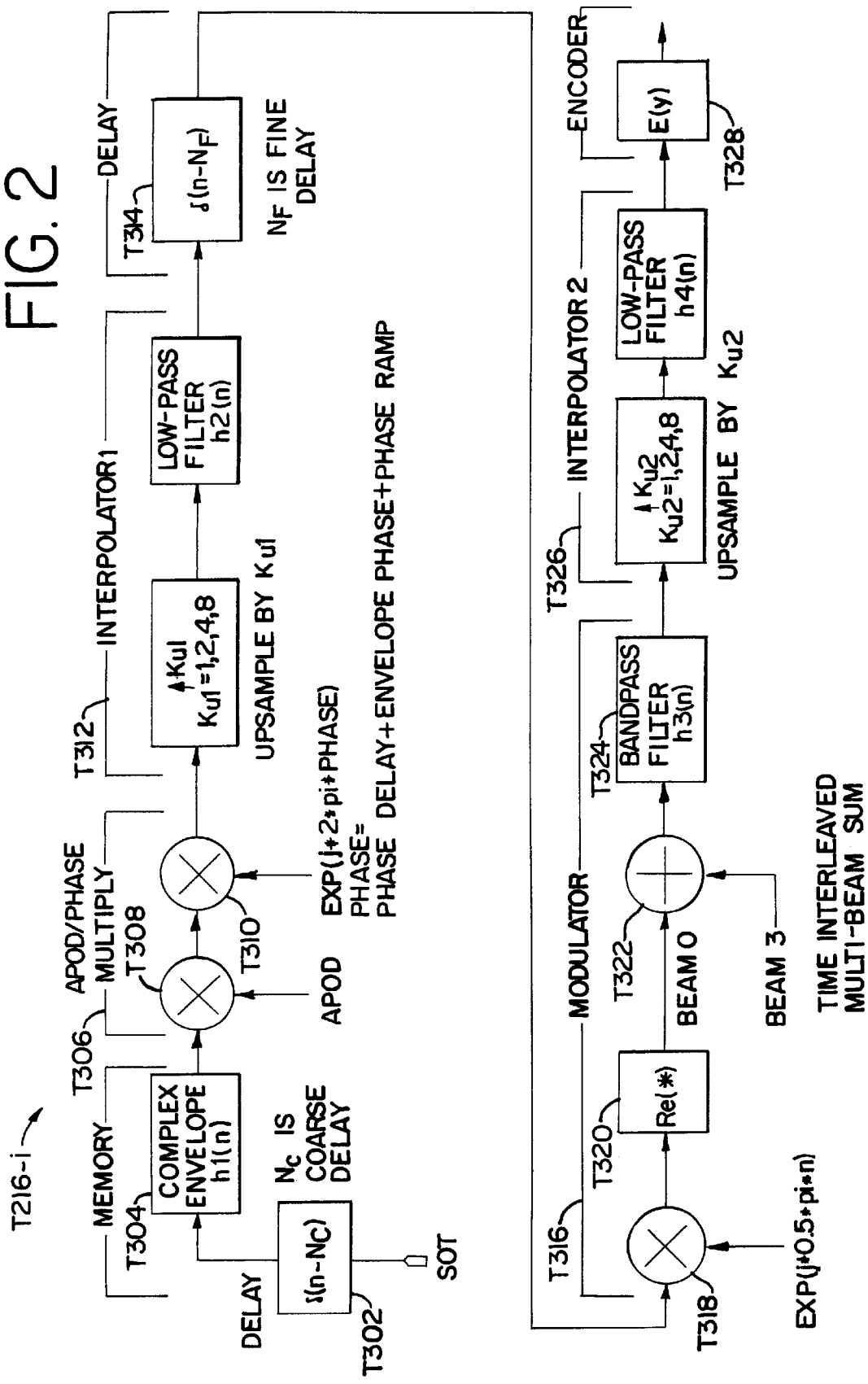
FIG. 2 is a block diagram representing one embodiment of a transmit channel of an ultrasound former.

The pulse wave generator 24 comprises transmit beamformer logic. Referring to FIG. 2, the transmit beamformer logic is generally shown. FIG. 2 and the reference numbers contained therein correspond to FIG. 3 of U.S. Pat. No. 5,675,554 for a Method And Apparatus For Transmit Beamformer, the disclosure of which is herein incorporated by reference. The transmit logic includes a coarse delay T302, a complex envelope memory T304, an apodization phase multiplier T306, an interpolator T312, a delay T314, a modulator T316, interpolator T326, and an encoder T328. Other transmit beam formation logic may be used, such as incorporating analog processes or other functional components. The transmit beam formation logic may include fewer or additional components. The transmit beam formation logic may comprise any structure for generating an excitation waveform.

The transmit beamformer logic generates a precisely programmed waveform, whose amplitude is apodized appropriately relative to other transmitters and/or channels, and delayed by a precisely defined time delay relative to a common start of transmit signal. The start of transmit signal triggers the coarse delay T302, which delays the readout of initial waveform samples. Real or complex initial waveform samples are read from the memory T304. The initial waveform samples are multiplied by an apodization value with a multiplier T308 and by a phase with a multiplier T310 of the multiplier T306. The multiplied samples are upsampled and low pass filtered with the interpolator T312 to a sample rate of preferably four samples per period of a transmit signal nominal center frequency. The upsampled samples are further delayed by the delay T314 to the desired delay for the transmit waveform from the corresponding transducer.

The delayed samples are modulated with the modulator T316. A multiplier T318 multiplies by an exponential function. The real part of the modulated signal is isolated by a functional block T320. A summer T322 sums together any other transmit waveforms associated with a particular transmit event for a transducer (i.e. multiple beam transmission or compound focus). The summed samples are filtered by a band pass filter T324.

The filter signals are upsampled to the input sample frequency of the DAC 26 (see FIG. 1) and low pass filtered by the interpolator T326. The upsampled signals are encoded by the encoder T328 to the form required for operating the DAC 26, such as thermometer coded, binary coded, or combinations thereof.

The transmit beamformer logic operates and responds to control instructions provided on the control signal input 32. The control instructions may comprise various start of transmit, apodization, delay, and phase rotation control information. Other control information may be provided, such as disclosed in U.S. Pat. No. 5,675,554 or for operation of different transmit beamformer logic.

Referring to FIG. 1, the digital waveform generated by the transmit beamformer logic of the pulse wave generator 24 is provided as a plurality of bits to the DAC 26. In one preferred embodiment, 10 bits of information are provided to the DAC 26, but other numbers may be used. The DAC 26 comprises any of various structures for converting digital information to analog information on an IC. For example, the DAC 26 comprises various capacitors 29, switches 27 and active circuits. In alternative embodiments, resistors are used in the DAC 26 or a portion of the DAC 26 is located separately from the IC of the transceiver 12. For example, resistors and active circuitry is separate from the IC. The DAC 26 converts the coded bits from the pulse wave generator 24 into an analog excitation waveform. The analog excitation waveform is provided to the amplifier 14 as discussed above.

Analog echo signals are input to the transceiver 12 at the ADC 30. The ADC 30 comprises IC components for converting the analog information into digital information. The ADC 30 preferably outputs 10 bits representing the receive signal, but other numbers of bits may be provided.

Figure 3:
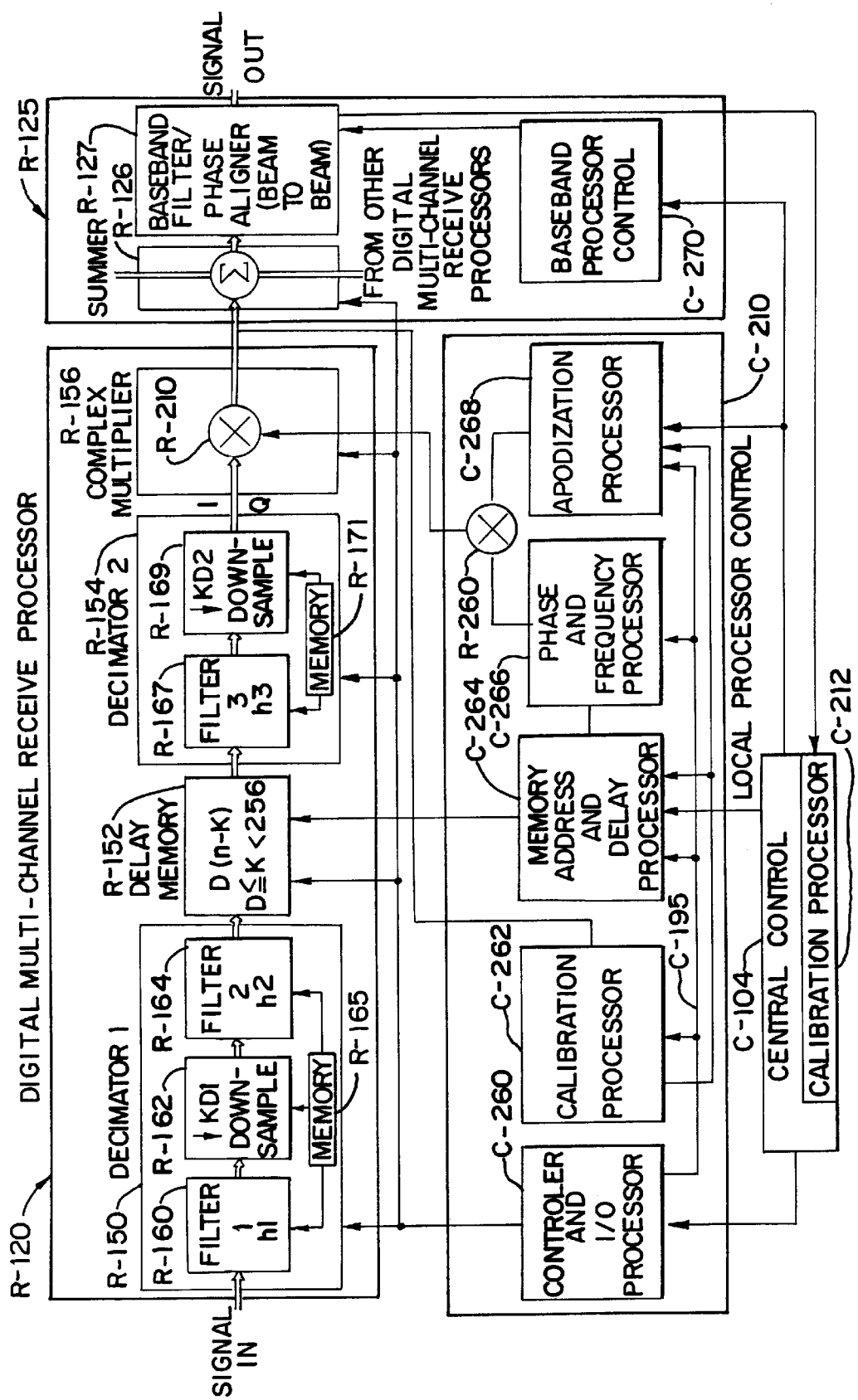
FIG. 3 is a block diagram representing one embodiment of a receive channel of an ultrasound beamformer.

The bits representing the receive signal are provided to the beamformer processor 28. The beamformer processor 28 comprises receive beamformer logic. Referring to FIG. 3, receive beamformer logic of one embodiment is generally shown at R-120. FIG. 3 and the reference numbers used therein correspond to FIG. 3 of U.S. Pat. No. 5,685,308 for a Method And Apparatus For Receive Beamformer System, the disclosure of which is herein incorporated by reference. The receive beamformer logic conceptually includes filter/delay and complex demodulation functions. The input signals are filtered and delayed. The demodulator preferably provides fine focusing in the form of phase rotation and apodization as well as signal demodulation to or near base band.

In one embodiment, the receive beamformer logic comprises a digital multichannel receive processor R-120 for processing any number, such as 1 to 4, superposed and separately delayed and apodized receive beams. The receive processor R-120 comprises a first decimator R-150, a delay memory R-152, a second decimator R-154 and a complex multiplier R-156. The receive beamformer logic may comprise other embodiments, including different, more or fewer components. Any logic for filtering, delaying, apodizing, or other receive beam formation processes may be used.

The decimator R-150 comprises a programmable or variable rate decimator filter, and includes a first filter R-160 with programmable filter coefficients, a decimator R-162, and a second filter R-164 also with programmable filter coefficients. The decimator 150 filters and down samples the digital signal.

The delay memory R-152 delays the decimated signals as a function of the delay profile across the aperture of the transducer and the range of the object to be imaged from the transducer array. In a preferred embodiment, the delay memory R-152 provides for a coarse time delay.

The delayed signals are provided to the decimator R-154, which further filters and down samples the signal with a filter R-167 and a down sampler R-169. Preferably, the decimator R-154 comprises an anti-alias complex band pass filter selecting positive image frequencies.

The further decimated signals are provided to the complex multiplier R-156. The complex multiplier R-156 provides for fine time delay with complex multiplication.

Referring to FIG. 1, the output of the receive beamformer processor 28 is provided to the summer 34. The summer 34 comprises any of various logic or analog devices for adding multiple inputs together. In the embodiment disclosed in FIG. 3, the summer 34 (see FIG. 1) is represented as R-126. The summer 34 is either located separate from the beamformer processor 28 or included as part of the receive logic of the beamformer processor 28. The summer 34 sums the signals from other receive channels with the signal from the receive channel of the transceiver 12. As is known in the art, sequential or parallel summation may be used. The sum of the signals from various receive channels represents the reflection of an acoustic waveform from a region.

The operation of the beam formation processor 28 and the summer 34 is controlled by signals from the control input 32. These control signals include the various controls disclosed in U.S. Pat. No. 5,685,308 or other controls for operating the receive channel of a receive beamformer. Some control information for receive processing may be calculable from or the same as control information for transmit processing. Therefore, the transmit and receive control signals may be efficiently combined into fewer signals.

In one preferred embodiment, a transceiver 12 is provided for each of a plurality of transducer elements. For receive beam formation, one of the transceivers 12 outputs data to the remainder of an ultrasound system for image processing. The other transceivers output partially summed data to other transceivers for summation. In alternative embodiments, two or more transmit and receive channels are provided on each transceiver 12.

Figure 4:
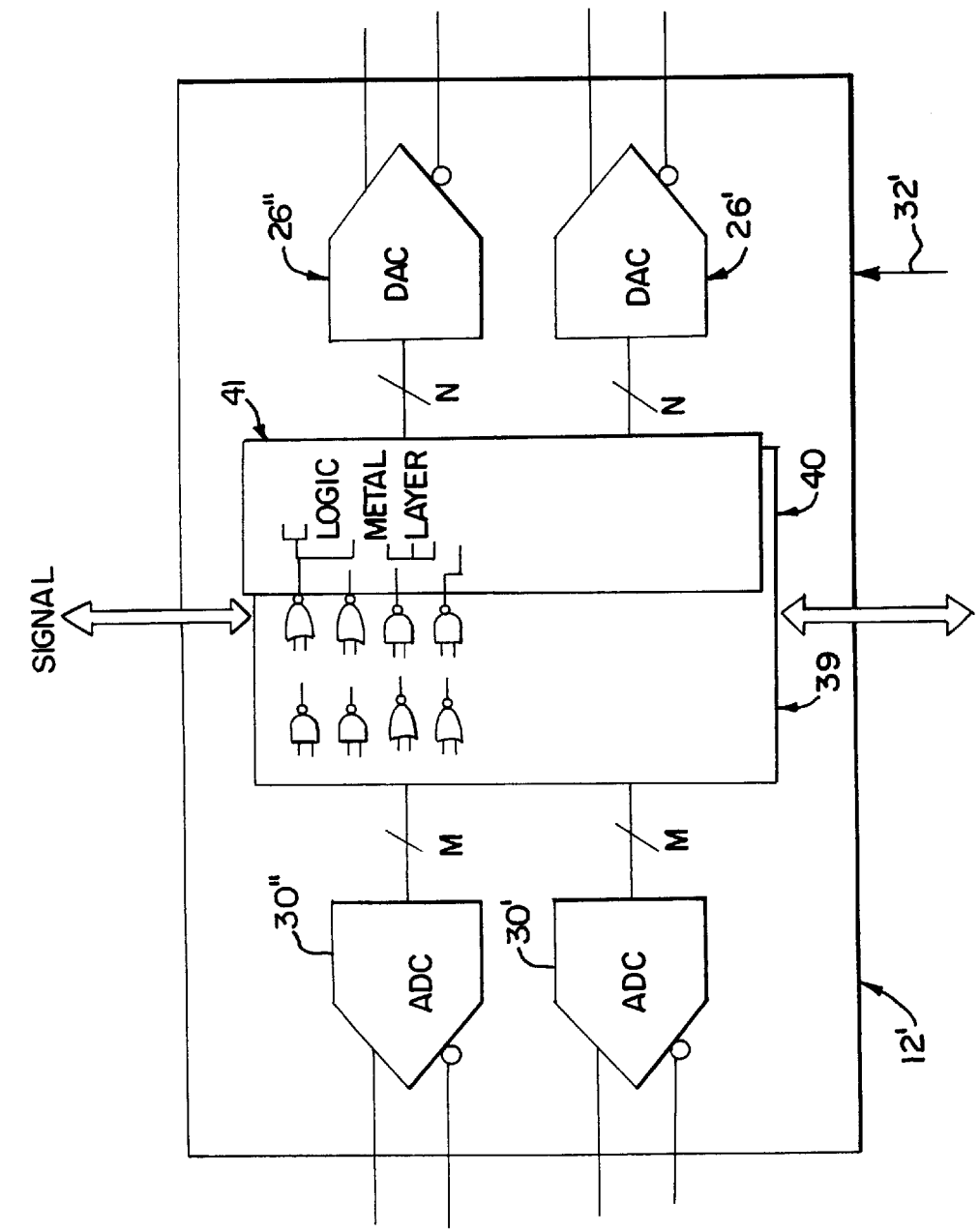
FIG. 4 Is a block diagram representing one embodiment of an ultrasound beamformer integrated transceiver.

Referring to FIG. 4, a preferred alternative embodiment of the transceiver 12 of FIG. 1 is generally shown as 12'. The transceiver 12' comprises a single CMOS ASIC. The number of channels is one or more depending upon the optimal chip size for manufacture. As shown, the transceiver 12' includes two transmit and two receive beamformer channels on a single IC substrate. Therefore, two ADCs 30' and 30" associated with two receive analog inputs and two DACs 26' and 26" associated with analog outputs are provided. An input for receiving partially summed receive signals and an output for outputting the summation of the partially summed signals with the signals from the receive channels of the transceiver 12' are provided. Control information is input on the control input line 32'.

The transceiver 12' includes a gate array structure 40. The gate array structure 40 corresponds to a generic embedded array structure 39 or sea of transistor logic gates, such as 200,000, interconnected with a logic metal layer 41. Eight NOR and NAND gates are represented in FIG. 4, but more or different logic elements may be provided in the generic embedded array structure 39. The gate array structure 40 is caused to function in accordance with the transmit and receive logic discussed above. The logic is implemented through the design of the logic metal layer 41. Clock drivers and other elements may also be connected through the logic metal layer 41. As an alternative to the gate array structure 40 with additional IC components, a full custom design is used for the entire transceiver or a digital signal processor with software is used.

For manufacture of the transceiver 12', the ADC and DAC functions are predesigned or custom manufactured and the array structure 39 is generically designed. For the generic gate array structure 39, the logic of any particular beamformer channel is implemented with the logic metal layer design. Semiconductor vendors may design the data acquisition and generation circuits (i.e. DAC 26 and ADC 30 and generic gate array structure 39) independently of the specific beamformer logic applied for an ultrasound system. Using the logic metal layer 41 and the generic gate array structure 39, N bits representing the transmit waveform are generated and M bits representing a receive signal are processed for each channel. In one embodiment, a clock rate input into the transceiver 12' is 100 megahertz, but other clock rates may be used. The gate array structure 40 interfaces with the ADC 30 and DAC 26 within the transceiver 12'.

In this embodiment, the use of analog instead of digital interfaces with the transceiver 12' for the transmit waveform and the receive signal may reduce the ASIC pin count. Therefore, the ASIC may be core limited instead of pad limited, allowing a reduction in cost as process geometries provide smaller gate arrays. By providing both receive and transmit channels in one transceiver 12', the number of high speed digital input and outputs may be reduced, resulting in a reduction of system power dissipation.

In one preferred embodiment, the ADC's 30', 30" and DACs 26', 26" comprise 10 bits, 50 or 58 dB signal to noise ratio, 80 or 100 mHz clockrate, differential input, one volt single side swing, 50 Ohm devices. In this embodiment, split power supplies for the ADC, DAC and logic structures are provided. The gate array comprises 200,000 gates clocked at 80 or 100 mHz. The transceiver 12' is surface connected to other circuitry using plastic quad flat pack or plastic bowl grid array connections, but other connections may be used, such as through hole connections. Devices characterized by different parameters may be used.

While the invention has been described above by reference to various embodiments, it will be understood that many changes and modifications can be made without departing from the scope of the invention. For example, the IC may include only a portion of either the ADC structures or the DAC structures. Other transmit or receive beamformers and associated logic may be used.

It is therefore intended that the foregoing detailed description be understood as an illustration of the presently preferred embodiments of the invention, and not as a definition of the invention. It is only the following claims, including all equivalents, that are intended to define the scope of this invention.

What is claimed is:

1. In an ultrasound system comprising a transmit beamformer and a receive beamformer, an improvement comprising:

an integrated circuit transceiver comprising ultrasound receive and transmit channels, the transmit channel comprising at least a portion of a digital to analog converter and transmit beamformer logic, and the receive channel comprising at least a portion of an analog to digital converter and receive beamformer logic;

wherein the transmit beamformer logic and receive channel logic comprise:
   a control signal input; and
   a gate array structure.

2. The ultrasound system of claim 1 wherein the gate array structure comprises: (1) a generic embedded array structure, (2) a designed logic metal layer and (3) an internal interface between the generic embedded array structure and (a) the at least the portion of the digital to analog converter and (b) the at least a portion of the analog to digital converter.

3. The ultrasound system of claim 1 wherein the transmit beamformer logic comprises at least one element selected from the group consisting of: an upsampler, an interpolator, a modulator, a time delay element, a focusing filter, and a phase rotation element.

4. The ultrasound system of claim 1 wherein the receive beamformer logic comprises at least one element selected from the group consisting of: a decimator, a delay unit, a focusing filter, a complex multiplier and a summer.

5. The ultrasound system of claim 1:

wherein the receive channel on the integrated transceiver further comprises an analog input and a receive beamformer logic output; and wherein the at least a portion of the analog to digital converter comprises an entire analog to digital converter.

6. The ultrasound system of claim 1:

wherein the transmit channel on the integrated transceiver further comprises an analog output; and wherein the at least a portion of the digital to analog converter comprises an entire digital to analog converter.

7. The ultrasound system of claim 6 wherein the digital to analog converter comprises switches and capacitors.

8. The ultrasound system of claim 1 wherein the integrated transceiver further comprises a plurality of the receive and transmit channels.

9. The ultrasound system of claim 1 wherein the integrated transceiver comprises a Complementary Metal Oxide Semiconductor integrated circuit.

10. A method for transmit and receive beamforming in an ultrasound system comprising the steps of:

(a) providing an integrated circuit transceiver comprising ultrasound receive and transmit channels, the transmit channel comprising at least a portion of a digital to analog converter and transmit beamformer logic, and the receive channel comprising at least a portion of an analog to digital converter and receive beamformer logic, the transmit and receive beamformer logic comprising a gate array structure;

(b) inputting a first set of control signals to the integrated transceiver;

(c) outputting an analog ultrasound transmit waveform responsive to the first set of control signals and the transmit channel;

(d) inputting a second set of control signals to the integrated transceiver;

(e) inputting an analog ultrasound echo signal to the integrated transceiver; and (f) outputting a digital signal responsive to the echo signal, the second set of control signals and the receive channel.

11. An integrated circuit transceiver in an ultrasound system, the integrated transceiver comprising:

a control signal input;

an ultrasound transmit waveform output;

transmit beamformer logic operatively connected to the control signal input;

a digital to analog converter operatively connected to the transmit beamformer logic and the ultrasound transmit waveform output;

an ultrasound echo signal input;

a receive signal output;

an analog to digital converter operatively connected to the ultrasound echo signal input; and receive beamformer logic operatively connected to the analog to digital converter and the receive signal output;

wherein the transmit and receive beamformer logic comprise a gate array structure.

* * * * *

UNITED STATES PATENT AND TRADEMARK OFFICE
CERTIFICATE OF CORRECTION

PATENT NO.   : 5,970,025
DATED        : October 19, 1999
INVENTOR(S)  : Christopher R. Cole et al.

It is certified that error appears in the above-identified patent and that said Letters Patent is hereby corrected as shown below:

In column 2, line 50, please change "former" to --beamformer--.

In column 2, line 53, please change "Is" to --is--.

Signed and Sealed this

Nineteenth Day of September, 2000

Attest:

Q. TODD DICKINSON

*Attesting Officer*      *Director of Patents and Trademarks*